(12) United States Patent
Tian

(10) Patent No.: US 9,251,568 B1
(45) Date of Patent: Feb. 2, 2016

(54) PSEUDO-SKELETON BASED IMAGE ENHANCEMENT FOR DOCUMENT IMAGE REPRODUCTION

(71) Applicant: KONICA MINOLTA LABORATORY U.S.A., INC., San Mateo, CA (US)

(72) Inventor: Yibin Tian, Menlo Park, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/473,907

(22) Filed: Aug. 29, 2014

(51) Int. Cl.
*G06K 9/40* (2006.01)
*G06T 5/00* (2006.01)
*G06T 7/00* (2006.01)

(52) U.S. Cl.
CPC ............. *G06T 5/001* (2013.01); *G06T 7/0081* (2013.01); *G06T 7/0085* (2013.01)

(58) Field of Classification Search
CPC ......... G06T 5/001; G06T 5/20; G06T 5/0081; G06T 5/0085
See application file for complete search history.

(56) References Cited

U.S. PATENT DOCUMENTS

| | | | |
|---|---|---|---|
| 5,825,937 A | 10/1998 | Ohuchi et al. | |
| 6,463,175 B1 * | 10/2002 | Lee | G06K 9/44 382/190 |
| 6,707,940 B1 * | 3/2004 | Qian | G06T 5/002 382/173 |
| 6,731,821 B1 | 5/2004 | Maurer et al. | |
| 7,505,632 B2 * | 3/2009 | Hu | G06K 9/40 358/1.1 |
| 8,036,442 B2 * | 10/2011 | Bernard | G06T 7/0012 378/98.5 |
| 8,320,639 B2 * | 11/2012 | Abe | A61B 5/0059 382/115 |
| 8,724,862 B2 * | 5/2014 | Minagawa | G06K 9/00375 382/124 |

OTHER PUBLICATIONS

Lin et al, "Distortion Modeling and Invariant Extraction for Digital Image Print-and-Scan Process", International Symposium on Multimedia Information Processing (ISMIP 99), Taipei, Taiwan, Dec. 1999.

* cited by examiner

*Primary Examiner* — Amir Alavi
(74) *Attorney, Agent, or Firm* — Chen Yoshimura LLP

(57) ABSTRACT

In a document image enhancement method, text character strokes are enhanced in a way such that areas closer to the center (skeleton) of each stroke are enhanced (e.g. made darker) by greater amounts than areas farther away from the center. Each text or line region of the input image is first binarized to generate a binary image containing connected components corresponding to character strokes and lines. Multiple levels of pseudo-skeletons are computed for each connected component, for example by using successive thinning. Multiple pseudo-skeleton difference areas, i.e. differences between successive levels of pseudo-skeletons, are generated. Pixels located in different pseudo-skeleton difference areas are enhanced by different amounts, by applying different inverse-degradation functions. Graphical regions of the input image may be treated with edge enhancement.

20 Claims, 2 Drawing Sheets

PSEUDO-SKELETON BASED IMAGE ENHANCEMENT FOR DOCUMENT IMAGE REPRODUCTION

BACKGROUND OF THE INVENTION

1. Field of the Invention

This invention relates to document image processing, and in particular, it relates to image enhancement for document image reproduction.

2. Description of Related Art

During document image reproduction, typically via printing and imaging (PAI), image quality is inevitably degraded. For example, dark texts in the document become lighter after each PAI process. In many cases, it is desirable to maintain visually conspicuous quality characteristics of a document image during its reproduction. One method to improve image quality is to enhance edges in the image; an example is described in U.S. Pat. No. 5,825,937. Another approach is to sharpen the image by contrast mapping; an example is described in U.S. Pat. No. 6,731,821. However, one significant disadvantage of these enhancement methods, when used in PAI for a document image, is that it makes the enhanced content fatter (e.g., text strokes become thicker) as the enhanced edges have greater impact on the neighboring background pixels during printing and imaging.

In many document images, text constitutes a majority of their content. When strokes of a character become thicker, many image features of the text characters, such as side profiles, zoning profile and topology etc., can be impacted. This may have a negative impact on the performance of document image processing systems, such as Optical Character Recognition (OCR) and document authentication systems.

SUMMARY

Accordingly, the present invention is directed to a method and related apparatus for image enhancement that substantially obviates one or more of the problems due to limitations and disadvantages of the related art.

An objective of the present invention is to provide a document image enhancement method that reduces the adverse impact on text stroke thickness.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for enhancing an input document image, which includes: segmenting the input document image into non-graphical regions and graphical regions; and for each non-graphical region: (a) binarizing the non-graphical region to generate a binary image containing connected components; (b) computing a plurality of levels of pseudo-skeletons for each connected component; (c) modifying pixel values of pixels of the input document image located in each of a plurality of pseudo-skeleton difference areas by applying a corresponding plurality of different inverse-degradation functions to the pixel values, each pseudo-skeleton difference area being an area between two successive levels of pseudo-skeletons.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

According to embodiments of the present invention, text character strokes and lines are enhanced in a way such that areas closer to the center (skeleton) of each stroke or line are enhanced (e.g. made darker) by greater amounts than areas farther away from the center. These different areas are obtained using pseudo-skeletons.

Figure 1:
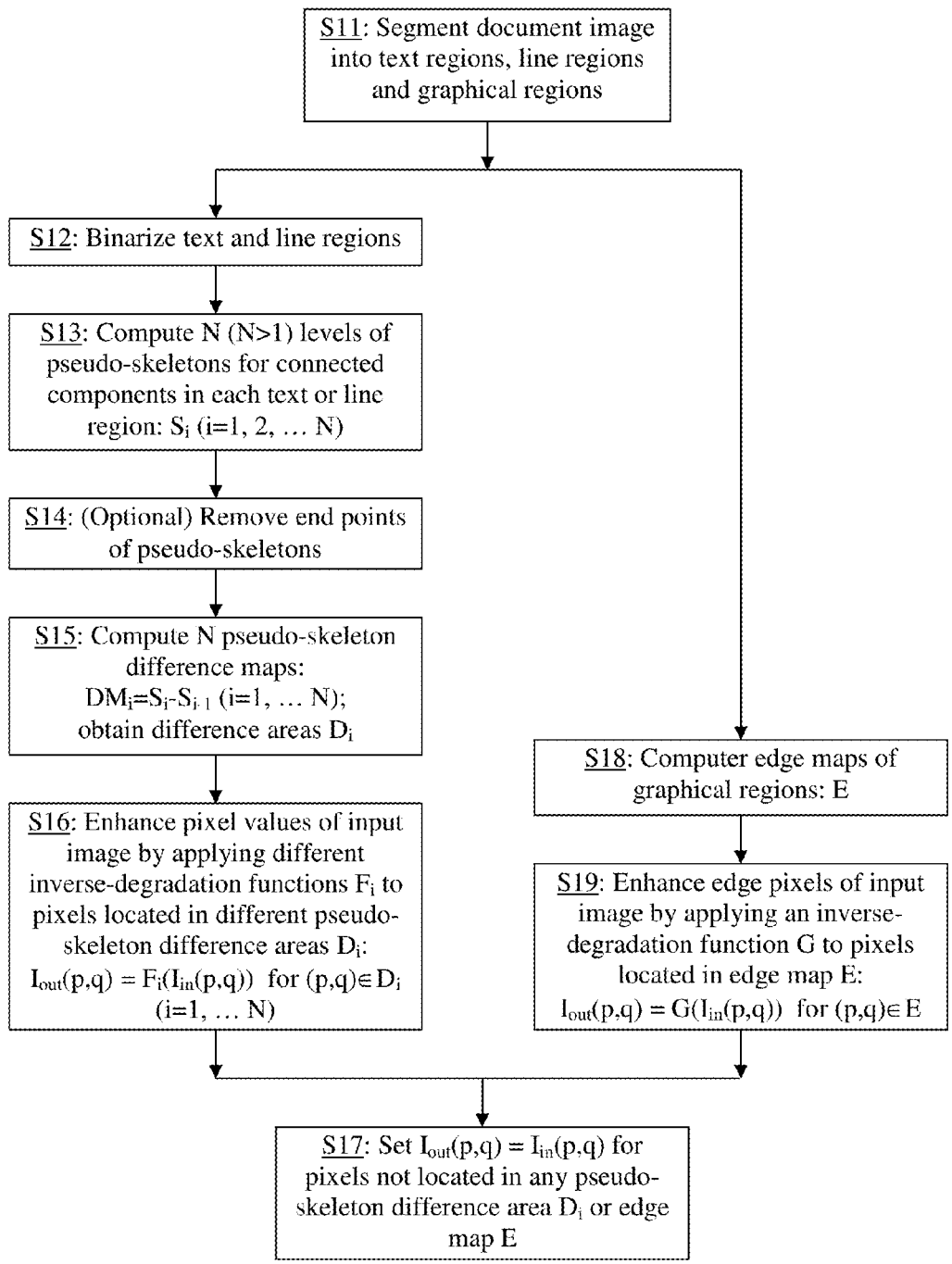
FIG. 1 schematically illustrates an image enhancement method according to an embodiment of the present invention.

FIG. 1 schematically illustrates a document image processing method according to an embodiment of the present invention.

The input digital image is a gray-scale or color document image generated by imaging a hard copy document, e.g. scanning. The input image is first segmented into text regions (regions that only contain text characters), line regions (regions that contain long lines, such as tables and line drawings) and graphical regions (areas containing photos and other graphics) (step S11). Many known techniques are available to segment documents; any suitable technique may be used for this step. The text and line regions may be referred to as non-graphical regions for convenience. For graphical regions, edge enhancement, or contrast mapping, or other techniques can be used to improve their quality, using known techniques (steps S21 and S22, described later). Text and line regions are binarized (step S12). Any suitable binarization technique may be used for this step, including global and local binarization. The binary image of the text and line regions contains connected components that correspond to character strokes and lines. Then, steps S13 to S16 are applied to the binary image for each text or line region generated in step S12.

For each binary image, multiple levels of pseudo-skeletons of the connected components are obtained sequentially (step S13). A skeleton is a one-pixel thick graph that represents the medial axis of a connected component. In some literature, morphological skeleton and topological skeleton are distinguished; for purposes of the present embodiment, either type can be used. Skeletons may be calculated from a binary image using morphological thinning operators such as erosion. According to embodiments of the present invention, a pseudo-skeleton of a connected component is a dilated version of its skeleton. Different levels of pseudo-skeletons correspond to different amounts or iterations of dilation. For computational efficiency, in step S13, multiple levels of pseudo-skeletons may be obtained by successive thinning of the original connected component, with or without computing the actual skeleton itself. The thinning process may take many iterations to reach the skeleton; the number of levels of pseudo-skeletons used in the subsequent steps may be smaller than the number of successive thinning steps it takes to thin the original connected component to a skeleton. For example, if it takes five successive thinning steps to thin the original connected component to a skeleton, the pseudo-skeletons that result from the second and fourth thinning steps, along with the original connected component, may be used as the multiple levels of pseudo-skeletons in the subsequent steps.

Optionally, the pseudo-skeletons are pruned, for example to remove end points (an end point is a point that has one pixel connected to it) or smaller branches, to straighten out zigzags, etc. (step S14). The general goal of this step is to clean up the pseudo-skeletons.

Figure 2A:
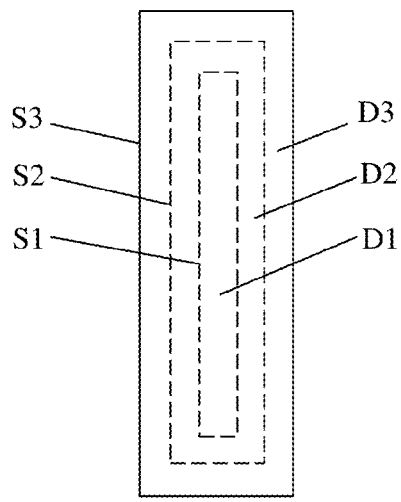
FIG. 2A schematically depicts multiple pseudo-skeletons of a connected component.

FIG. 2A schematically illustrates an example of pseudo-skeletons of a connected component, which is a short straight line in this example. The solid and dashed line shapes S3, S2 and S1 depict three levels of pseudo-skeletons. Note that each pseudo-skeleton is the area enclosed by the corresponding solid or dashed line. The inner-most pseudo-skeleton S1 may or may not be the actual skeleton (the actual skeleton is one pixel wide); the outer-most pseudo-skeleton S3 may or may not be the original connected component. When the multiple levels of pseudo-skeletons are generated by successively thinning the original connected component, the outer-most pseudo-skeleton is typically also the original connected component (in this example, the outer-most pseudo-skeleton S3 is the original connected component and is shown by a solid line). When the multiple levels of pseudo-skeletons are generated by computing the skeleton and then successively dilating it, the inner-most pseudo-skeleton is typically also the actual skeleton. In the latter case, the outer-most pseudo-skeleton preferably encloses the original connected component.

Referring back to FIG. 1, a difference map between each pair of successive levels of pseudo-skeletons is computed (step S15). The areas in a difference map that have non-zero pixel values are referred to as pseudo-skeleton difference areas. A pseudo-skeleton difference area for a connected component will typically be a ring (outline) shape; multiple pseudo-skeleton difference areas corresponding to multiple pairs of pseudo-skeletons will typically be adjoining nested ring (outline) shapes. In FIG. 2A, the area D3 between the lines S3 and S2 is the pseudo-skeleton difference area between pseudo-skeletons S3 and S2, etc. The inner-most pseudo-skeleton difference area D1 is the same as the inner-most pseudo-skeleton S1. In other words, the pseudo-skeleton difference maps can be expressed as: $DM_i = S_i - S_{i-1}$ (i=1, ... N), where N>1 is the total number of levels of pseudo-skeletons; $S_0$ is defined as an all-zero map. $D_i$ is the non-zero areas of $DM_i$.

Then, the pixel values of the original image are modified (enhanced) by applying a number of different inverse-degradation functions to the input pixel values located in different pseudo-skeleton difference areas, to form corresponding areas of the output image (step S16). More specifically, pixel values for pixels located within each pseudo-skeleton difference area $D_i$ are mapped by a corresponding inverse-degradation function $F_i$:

$$I_{out}(p,q) = F_i(I_{in}(p,q)) \text{ for } (p,q) \in D_i, i=1, \ldots N \quad (1)$$

wherein $I_{out}$ is the output image (gray-scale or color), is the input image (gray-scale or color), and (p,q) is the pixel location in the input and output images.

A degradation function of a PAI is a function that models how pixel values are degraded by the PAI process. The degradation function, which will depend on the characteristics of the physical devices used for imaging (scanning) the original document and printing the reproduced document, can be obtained empirically. Any suitable method may be used to determine the degradation function of a PAI process. In one example, the degradation function of each color channel of a PAI is a linear function: $y_c = a_c x_c + b_c$, where c is the color channel, $x_c$ is the pixel value in the original image (before PAI), $y_c$ is the pixel value after PAI, and $a_c$ and $b_c$ are parameters. The degradation function can also be modeled as a non-linear function. An inverse-degradation function is the inverse of a degradation function. In the above linear example, the inverse-degradation function is $x_c = (y_c - b_c)/a_c$. When a degradation function is non-linear, there may not be an analytical solution for its inverse-degradation function and a look-up table must be used. Even when there is an analytical solution for an inverse-degradation function, a look-up table can still be used to speed up computation.

Figure 2B:
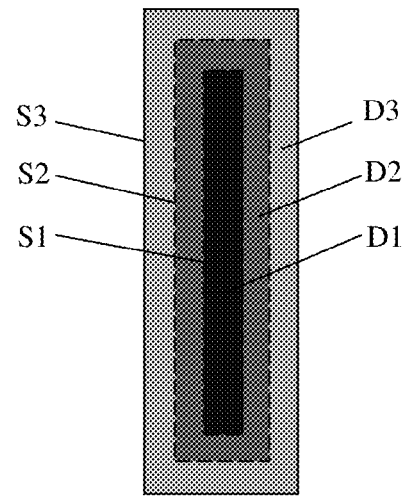
FIG. 2B schematically depicts different enhancement for parts of the connected component corresponding to different pseudo-skeleton difference areas.

In one example, in step S16, inverse-degradation functions $x_c = (y_c - b_{ci})/a_{ci}$ with different parameter values $a_{ci}$ and $b_{ci}$ are used to modify pixels located in different pseudo-skeleton difference areas $D_i$. More generally, the different inverse-degradation functions $F_i$ are inverse-degradation functions with different parameters. In a preferred embodiment, relatively more central areas of the connected components (e.g. pseudo-skeleton difference area D1 in the example of FIG. 2A) are enhanced by larger amounts than the relatively more peripheral areas (e.g. pseudo-skeleton difference areas D2 and D3 in the example of FIG. 2A). This is schematically illustrated in FIG. 2B, which corresponds to FIG. 2A, where the pseudo-skeleton difference areas D1, D2 and D3 (from center to periphery) are shown with different shadings to schematically illustrate the different enhancement applied to the various pseudo-skeleton difference areas.

For graphical regions segmented in step S11, edge enhancement may be performed. This includes computing an edge map E for the graphical region (step S18), and modifying (enhancing) pixels of the original image within the edge map E by applying an inverse-degradation function G (step S19):

$$I_{out}(p,q) = G(I_{in}(p,q)) \text{ for } (p,q) \in E \quad (2)$$

Then, for pixels not located in any pseudo-skeleton difference areas $D_i$ and not located in the edge map E, the input pixel values can be copied as the output pixel values without any enhancement, or enhanced with some other enhancement methods such as contrast mapping. This can be expressed as:

$$I_{out}(p,q) = H(I_{in}(p,q)) \text{ for } (p,q) \notin E \text{ and}$$
$$(p,q) \notin D_i, i=1, \ldots N \quad (3)$$

where H is either an identity function or some other mapping.

The output image (gray-scale or color) is generated by combining the output image $I_{out}$ of different areas $D_i$, E and the other areas calculated by equations (1), (2) and (3) (step S17).

Figure 3:
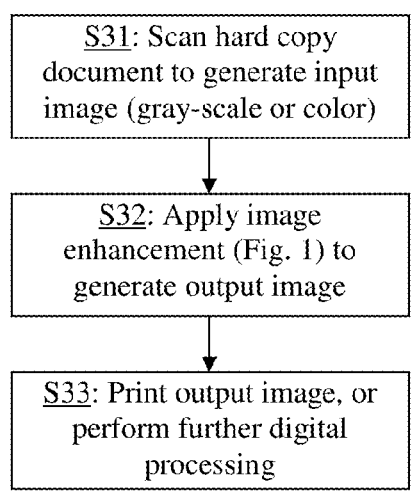
FIG. 3 schematically illustrates a printing and imaging process that incorporates the image enhancement method according to embodiments of the present invention.

The general work flow of the PAI process is shown in FIG. 3. A hard copy original document is scanned to generate an input digital image, either gray-scale or color (step S31). The image enhancement process described above (FIG. 1) is applied to the input digital image to generate an output digital image (step S32), and the output digital image is printed to generate a reproduced hard copy (step S33). In an alternative work flow, the output image generated by the image enhancement process is subject to further digital image processing, such as binarization, OCR, etc.

Figure 4:
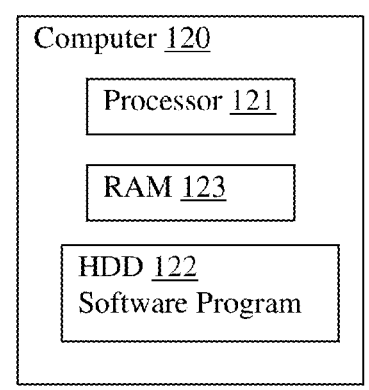
FIG. 4 schematically illustrates a data processing apparatus in which embodiments of the present invention may be implemented.

The image enhancement methods described here can be implemented in a data processing system such as a computer 120 as shown in FIG. 4. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods. The computer 120 may be a stand-alone computer, or a part of a scanner, printer, copier, or all-in-one (scanner, printer, copier in one) machine. In one aspect, the invention is a method carried out by a data processing system. In another aspect, the invention is computer program product embodied in computer usable non-transitory medium having a computer readable program code embedded therein for controlling a data processing apparatus to carry out the method. In another aspect, the invention is embodied in a data processing system.

It will be apparent to those skilled in the art that various modification and variations can be made in the image enhancement method of the present invention without departing from the spirit or scope of the invention. Thus, it is intended that the present invention cover modifications and variations that come within the scope of the appended claims and their equivalents.

What is claimed is:

1. A method for enhancing an input document image, comprising:
    segmenting the input document image into non-graphical regions and graphical regions; and
    for each non-graphical region:
    (a) binarizing the non-graphical region to generate a binary image containing connected components;
    (b) computing a plurality of levels of pseudo-skeletons for each connected component;
    (c) modifying pixel values of pixels of the input document image located in each of a plurality of pseudo-skeleton difference areas by applying a corresponding plurality of different inverse-degradation functions to the pixel values, each pseudo-skeleton difference area being an area between two successive levels of pseudo-skeletons.

2. The method of claim 1, wherein step (b) includes successively thinning each connected component to generate the plurality of levels of pseudo-skeletons.

3. The method of claim 1, wherein step (b) includes computing a skeleton for each connected component and successively dilating the skeleton to generate the plurality of levels of pseudo-skeletons.

4. The method of claim 1, further comprising, before step (c), obtaining the plurality of pseudo-skeleton difference areas by computing difference maps of pairs of successive levels of pseudo-skeletons.

5. The method of claim 1, wherein in step (c), the plurality of different inverse-degradation functions enhance pixel values of pixels located in a pseudo-skeleton difference area closer to a skeleton of a connected component by a larger amount than pixels located in another pseudo-skeleton difference area farther away from the skeleton.

6. The method of claim 1, wherein in step (c), the plurality of different inverse-degradation functions are a linear function with different parameters.

7. The method of claim 1, wherein in step (c), the plurality of different inverse-degradation functions are a non-linear function with different parameters.

8. The method of claim 1, further comprising, between step (b) and step (c), removing end points of the plurality of pseudo-skeletons.

9. The method of claim 1, further comprising, for each graphical region:
    (e) computing an edge map; and
    (f) modifying pixel values of pixels of the input document image located in the edge map by applying an inverse-degradation function to the pixel values.

10. The method of claim 9, further comprising:
    combining pixels located in the plurality of pseudo-skeleton difference areas after modification by step (d), pixels located in the edge map after modification by step (f), and pixels located in areas outside of any of the pseudo-skeleton difference areas and the edge map without modification, to generate an output document image.

11. A computer program product comprising a computer usable non-transitory medium having a computer readable program code embedded therein for controlling a data processing apparatus, the computer readable program code configured to cause the data processing apparatus to execute a process of enhancing an input document image, the process comprising:
    segmenting the input document image into non-graphical regions and graphical regions; and
    for each non-graphical region:
    (a) binarizing the non-graphical region to generate a binary image containing connected components;
    (b) computing a plurality of levels of pseudo-skeletons for each connected component;
    (c) modifying pixel values of pixels of the input document image located in each of a plurality of pseudo-skeleton difference areas by applying a corresponding plurality of different inverse-degradation functions to the pixel values, each pseudo-skeleton difference area being an area between two successive levels of pseudo-skeletons.

12. The computer program product of claim 11, wherein step (b) includes successively thinning each connected component to generate the plurality of levels of pseudo-skeletons.

13. The computer program product of claim 11, wherein step (b) includes computing a skeleton for each connected component and successively dilating the skeleton to generate the plurality of levels of pseudo-skeletons.

14. The computer program product of claim 11, wherein the process further comprises, before step (c), obtaining the plurality of pseudo-skeleton difference areas by computing difference maps of pairs of successive levels of pseudo-skeletons.

15. The computer program product of claim 11, wherein in step (c), the plurality of different inverse-degradation functions enhance pixel values of pixels located in a pseudo-skeleton difference area closer to a skeleton of a connected component by a larger amount than pixels located in another pseudo-skeleton difference area farther away from the skeleton.

16. The computer program product of claim 11, wherein in step (c), the plurality of different inverse-degradation functions are a linear function with different parameters.

17. The computer program product of claim 11, wherein in step (c), the plurality of different inverse-degradation functions are a non-linear function with different parameters.

18. The computer program product of claim 11, wherein the process further comprises, between step (b) and step (c), removing end points of the plurality of pseudo-skeletons.

19. The computer program product of claim 11, wherein the process further comprises, for each graphical region:

(e) computing an edge map; and
(f) modifying pixel values of pixels of the input document image located in the edge map by applying an inverse-degradation function to the pixel values.

20. The computer program product of claim 19, wherein the process further comprises:
  combining pixels located in the plurality of pseudo-skeleton difference areas after modification by step (d), pixels located in the edge map after modification by step (f), and pixels located in areas outside of any of the pseudo-skeleton difference areas and the edge map without modification, to generate an output document image.

\* \* \* \* \*